March 6, 1956

W. J. SCHIESER ET AL
INJECTION MOLDING MACHINE WITH
AUTOMATICALLY-CONTROLLED
WEIGH-FEEDER 2,736,923

Filed Nov. 23, 1954

INVENTORS
WARREN J. SCHIESER
JOHN F. KELLEY
BY

ATTORNEYS

March 6, 1956

W. J. SCHIESER ET AL 2,736,923

INJECTION MOLDING MACHINE WITH
AUTOMATICALLY-CONTROLLED
WEIGH-FEEDER

Filed Nov. 23, 1954

INVENTORS
WARREN J. SCHIESER
JOHN F. KELLEY
BY
ATTORNEYS

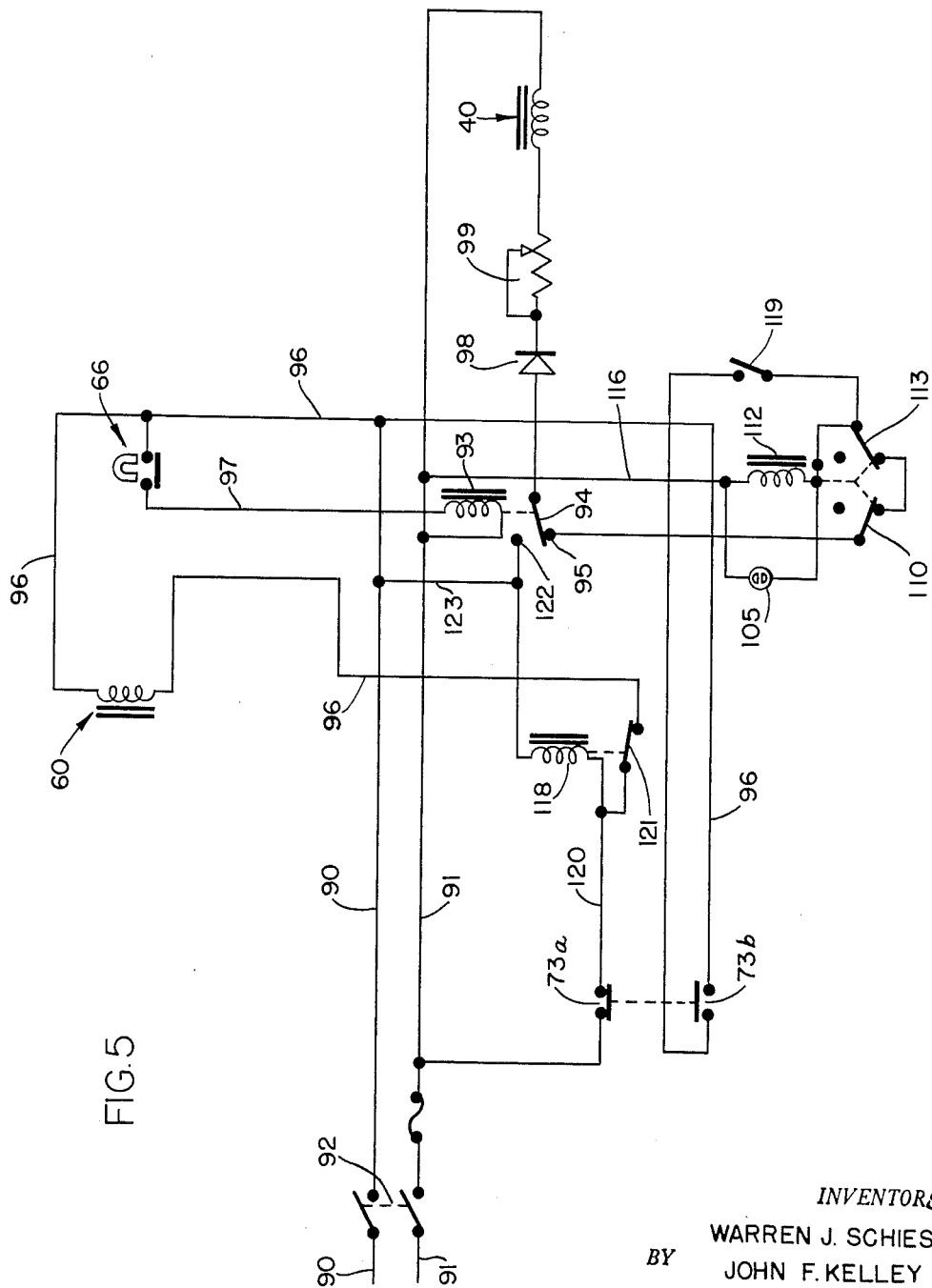

March 6, 1956
W. J. SCHIESER ET AL
INJECTION MOLDING MACHINE WITH
AUTOMATICALLY-CONTROLLED
WEIGH-FEEDER
2,736,923
Filed Nov. 23, 1954
5 Sheets-Sheet 4
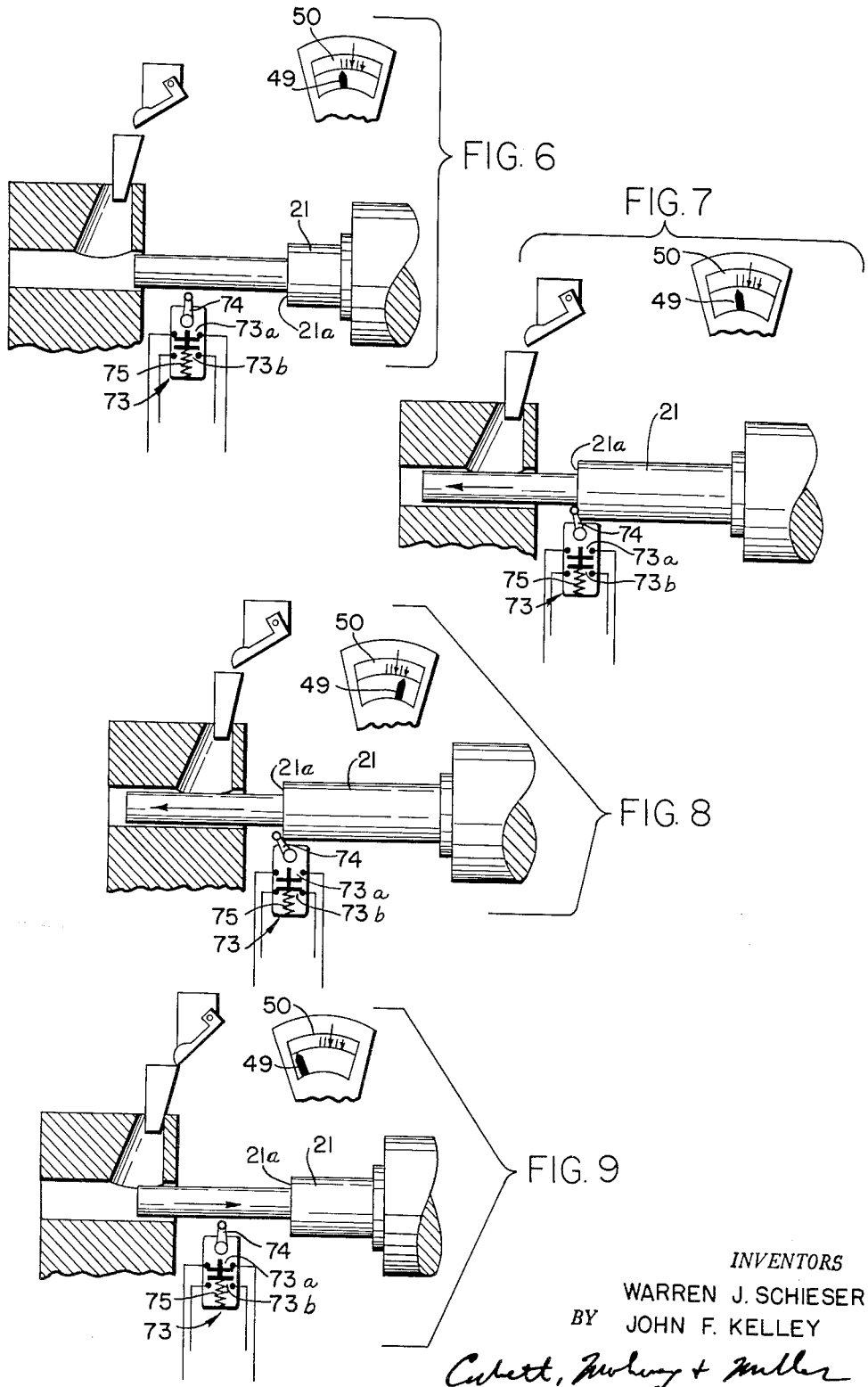
INVENTORS
WARREN J. SCHIESER
JOHN F. KELLEY
BY
Corbett, Mahony + Miller
ATTORNEYS

INVENTORS.
WARREN J. SCHIESER
JOHN F. KELLEY

United States Patent Office 2,736,923
Patented Mar. 6, 1956

2,736,923

INJECTION MOLDING MACHINE WITH AUTO-
MATICALLY-CONTROLLED WEIGH-FEEDER

Warren J. Schieser and John F. Kelley, Columbus, Ohio, assignors to The Exact Weight Scale Company, Columbus, Ohio, a corporation of Ohio Application November 23, 1954, Serial No. 470,665

14 Claims. (Cl. 18—30)

Our invention relates to an injection molding machine with automatically-controlled weigh-feeder. It has to do, more specifically, with an injection molding machine for molding plastic materials which is provided with a weigh-feeder that is automatically controlled by the injection molding apparatus of the machine.

This application is a continuation-in-part of our copending application Serial No. 400,168, filed December 24, 1953.

The practice of weigh-feeding the charge of plastic molding material to an injection molding machine has become widely accepted and several advantages over the previously-used system of volume-measuring the charge are realized. These advantages are outlined in various current scientific papers and technical bulletins and since they are so widely accepted, they need not be discussed in detail herein.

With plastic injection molding machines used at present, generally speaking, the manner of injecting the shot or charge of plastic molding material into the die or mold is by one of two systems which are described as starved-feeding, or cushion-feeding the die or mold.

Starved-feeding may be described as the system in which the exact amount of plastic molding material required to fill the die or mold is fed to the molding machine feed chamber ahead of the ram of the machine. The ram, which is usually operated hydraulically, then forces the shot or charge into the die or mold via the plasticizer or heat chamber. In so doing, the ram operates to the limit of its stroke, the limit being determined by a mechanical stop. A ram operating in this manner is said to be bottoming.

Cushion-feeding differs from starved-feeding in that the ram does not bottom, due to an excess amount of molding material purposely provided ahead of the ram. The excess of molding material cannot be forced into the die or mold and, therefore, serves as a cushion for the ram as it reaches the extent of its injection stroke.

Whether the ram of an injection molding machine is to be starved-fed or cushion-fed, depends upon many things, such as the type of plastic molding material being used, the type of die or mold, the type of press, and the judgment of the molder. It is quite generally agreed that, regardless of whether the die is starved-fed or cushion-fed, weigh-feeding an exact amount of plastic molding material to the feed chamber of the ram for subsequent feeding to the die is desirable, and in many cases essential, in order to maintain control of the ram to keep it bottoming when starved-feeding to the die or to maintain a uniform cushion ahead of the ram when cushion-feeding to the die.

It will be understood that if a charge of plastic molding material is delivered to the ram and is light in weight, this will cause a short shot, that is an unfilled die, or will cause a decreased cushion, depending upon the method of feeding the die. If the quantity of plastic molding material delivered to the ram is heavy in weight, it could prevent the ram from bottoming or increase the cushion to an undesirable extent, depending upon the method of feeding the die. The results of varying the charge of plastic molding material delivered to the ram might cause the above conditions to occur quickly or over a long period of time, depending upon the degree of error in each delivered charge, and other factors described below.

Factors, other than variation in the charge of the plastic molding material delivered to the ram, can cause improper bottoming of the ram or changes in size of the cushion. For example, these may be: variations in hydraulic pressure driving the ram; variations in temperature that would affect the degree of plasticizing of the material supplied to the ram and would alter resistance to flow of the material into the die; variations in the time cycle during which pressure is applied to the ram; and variations in over-all cycle time caused by the operator.

Since the variables described above do exist, there is a need for a weigh-feeder in an injection molding machine which not only weighs each charge and supplies it to the ram but which will be automatically adjusted by operation of the ram to compensate for these variables so as to eliminate the undesirable effects on the ram position caused by all of the aforementioned variables. This need is more pronounced in the case of cushion-feeding but is present in the case of starved-feeding.

It is one object of our invention to provide a simple, efficient and positive weigh-feeding means in an injection molding machine which is automatically actuated by the ram of the machine to supply accurately weighed charges of molding material to the ram at the proper instants.

Another object of our invention is to provide weigh-feeding means of the type indicated above in an injection molding machine which not only supplies each successively weighed charge at the proper instant, but automatically varies such successive charges under the control of the ram and in accordance with the variables mentioned above.

According to our invention, we provide a weigh-feeder in an injection molding machine which will automatically weigh a predetermined charge of material for feeding to the ram of the molding apparatus. Means is provided in association with the ram for automatically actuating control mechanism on the weigh-feeder which will control feeding of the weighed charge to the ram at the proper instant. Also, compensating means is provided in association with the ram for automatically actuating control mechanism on the weigh-feeder which will vary the amount of material supplied in successive charges in accordance with the variable positions the ram might take at the end of successive injection strokes due to the variable factors discussed above. According to the present invention, this means takes the form of an electric circuit which is controlled by the position of the ram at the end of its injection stroke and which controls the feeding mechanism of the weigh-feeder to adjust the weight of successive charges if adjustment is needed.

Preferred embodiments of our invention are illustrated in the accompanying drawings wherein similar characters of reference designate corresponding parts and wherein:

Figure 5 is a circuit diagram of the complete circuit for controlling the means on the weigh-feeder for supplying the charge to the ram and the weight-compensating arrangement thereof.

Figures 6 to 9 inclusive are diagrammatic views illustrating successive steps in the operation of our weigh-feeder having the weight-compensating arrangement thereon.

Figure 10:
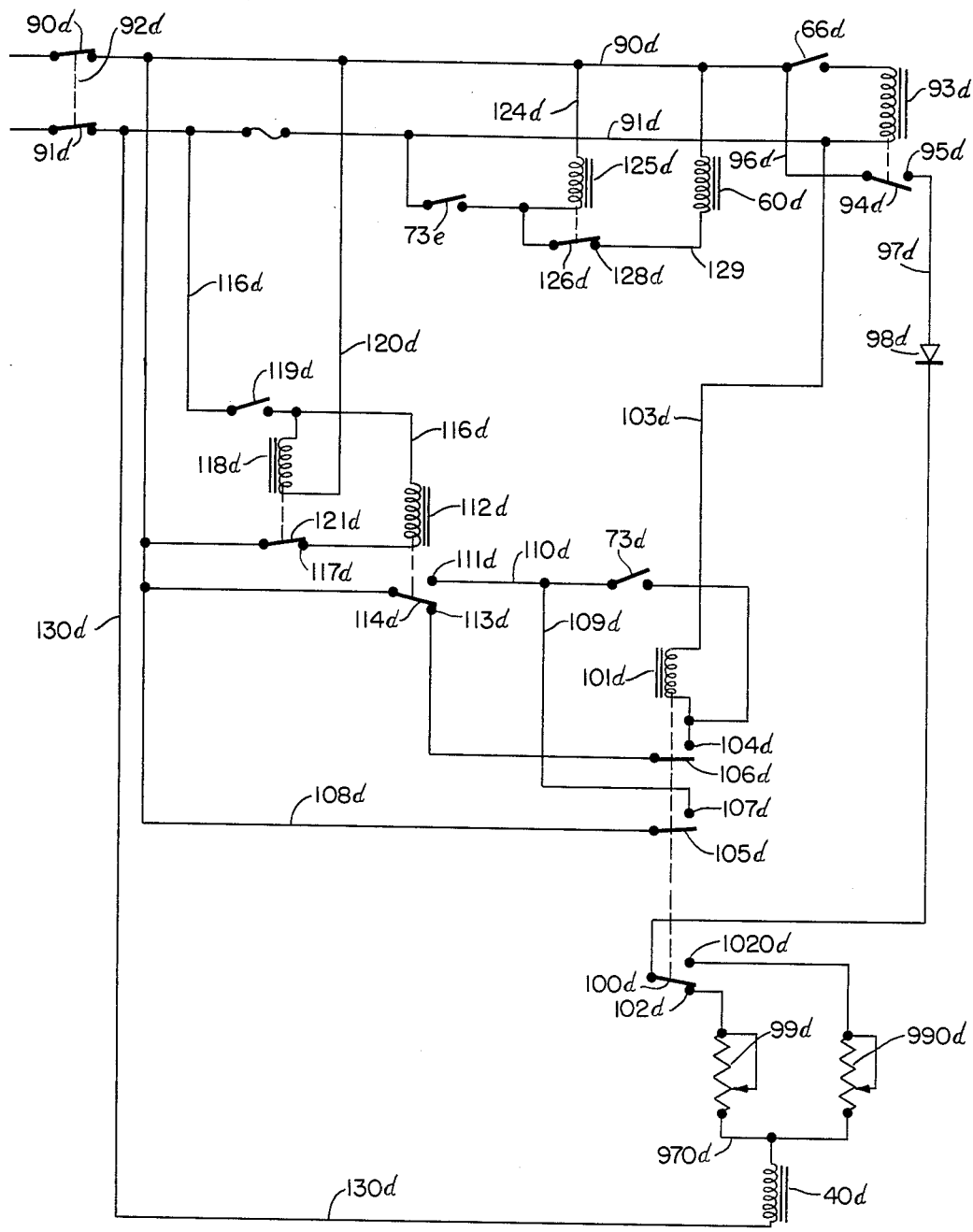

Figure 10 is a diagram of an electric circuit of a different weight-compensating arrangement and which may be substituted for the circuit of Figure 5.

Figure 1:
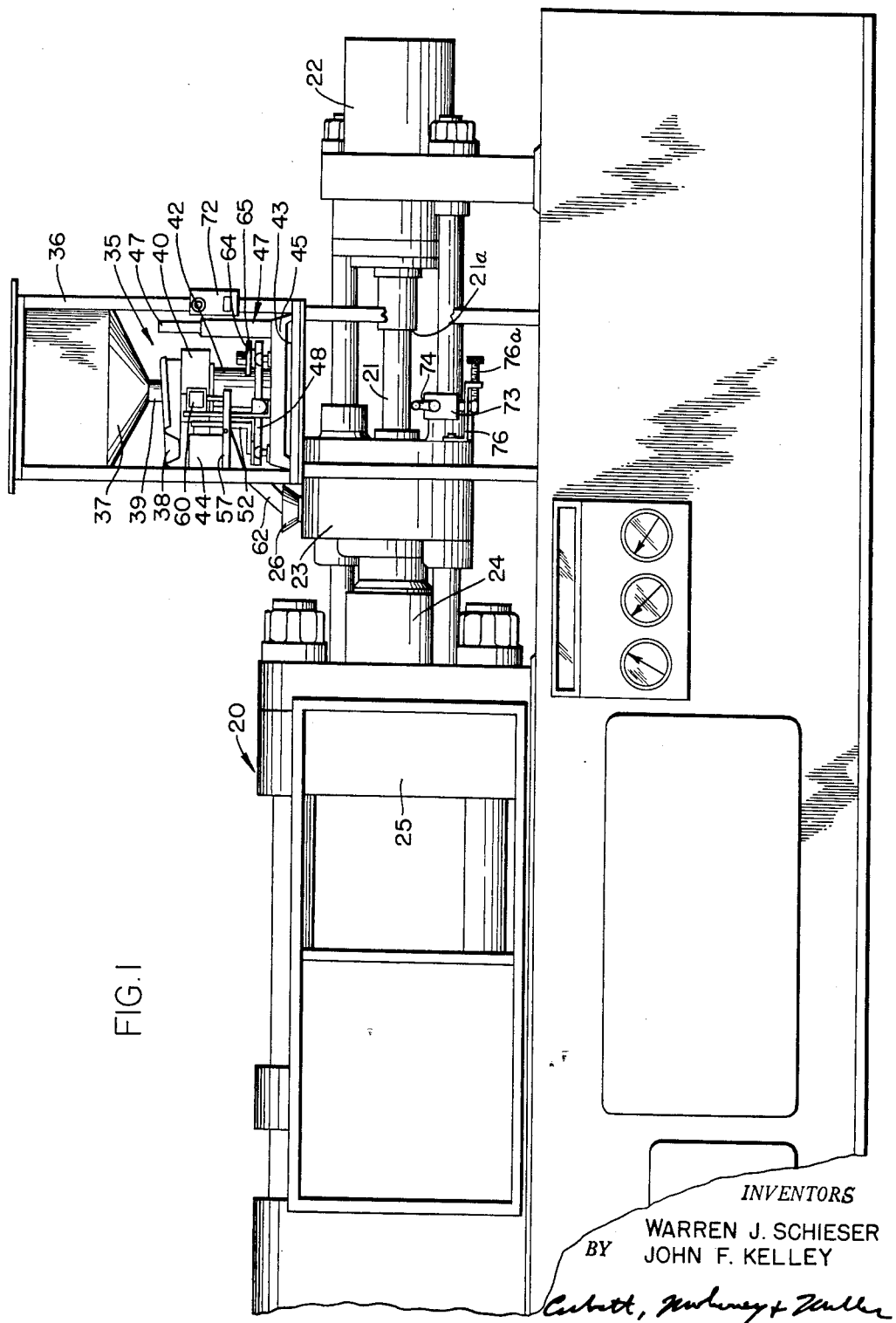
Figure 1 is a side elevational view illustrating an injection molding machine having a weigh-feeder in accordance with our invention.

With reference to the drawings, in Figure 1, we have illustrated our invention embodied in an injection molding press of the horizontal type but it is to be understood that it could be embodied in a press of the vertical type.

Our invention is not limited to any special make of press but is applicable to any press wherein there is provided a ram structure for injecting the molding material into the die or mold.

In the press shown in Figure 1, the press in general is indicated by the numeral 20. This press includes the ram 21 which is operated by a hydraulic cylinder 22. In the injection or molding operation, the ram 21 is moved forwardly through a feed section 23 and through a heating or plasticizing section 24, to force the plastic molding material ahead of it into a mold or die section 25. This section 25 will contain a suitable single cavity or set of die cavities into which the ram 21 will force the plasticized molding charge which has been previously fed to the ram in granular form through an inlet funnel 26 on the section 23.

Figure 4:
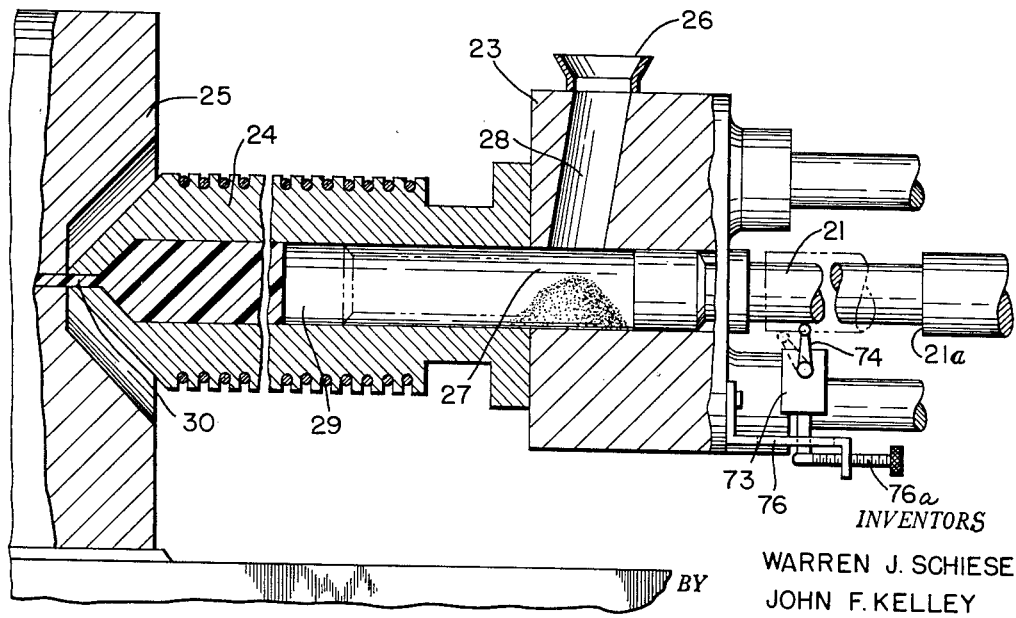
Figure 4 is a longitudinal schematic section through the ram and associated feeding and heating chambers illustrating the switches provided on the ram for controlling the supply of successive charges to the ram and the weight of such successive charges.

As shown in Figure 4, the funnel 26 directs the granular plastic material into a feed chamber 27 through the inlet slot 28 in the top thereof. The ram 21, when projected forwardly, will completely close this inlet slot after moving the previously supplied charge of material forwardly into the plasticizing chamber 29, provided in section 24, where it is gradually heated and melted as it passes through the chamber and before it reaches the nozzle 30 where it is injected into one or more mold cavities in the section 25 by the forward movement of the ram 21. When the ram 21 is retracted rearwardly to the limit of its movement, the forward end of the ram will be behind the inlet opening 28 and a charge of material, previously dumped into the funnel 26, can then drop in front of the ram for subsequent forward movement through the feed chamber 27, the plasticizing chamber 29, and into the die cavity or cavities. It will be noted that the press 20 is so constructed that a portion of the ram 21 lying between the cylinder 22 and the feed section 23 of the press is always exposed.

For automatically supplying successive charges of the plastic molding material to the funnel 26, we provide the weigh-feeder 35. This weigh-feeder 35 is supported by a suitable vertical framework 36 which is attached to the frame of the press 20 in such a location that the weigh-feeder will feed successively weighed charges of material into the funnel 26.

Figure 2:
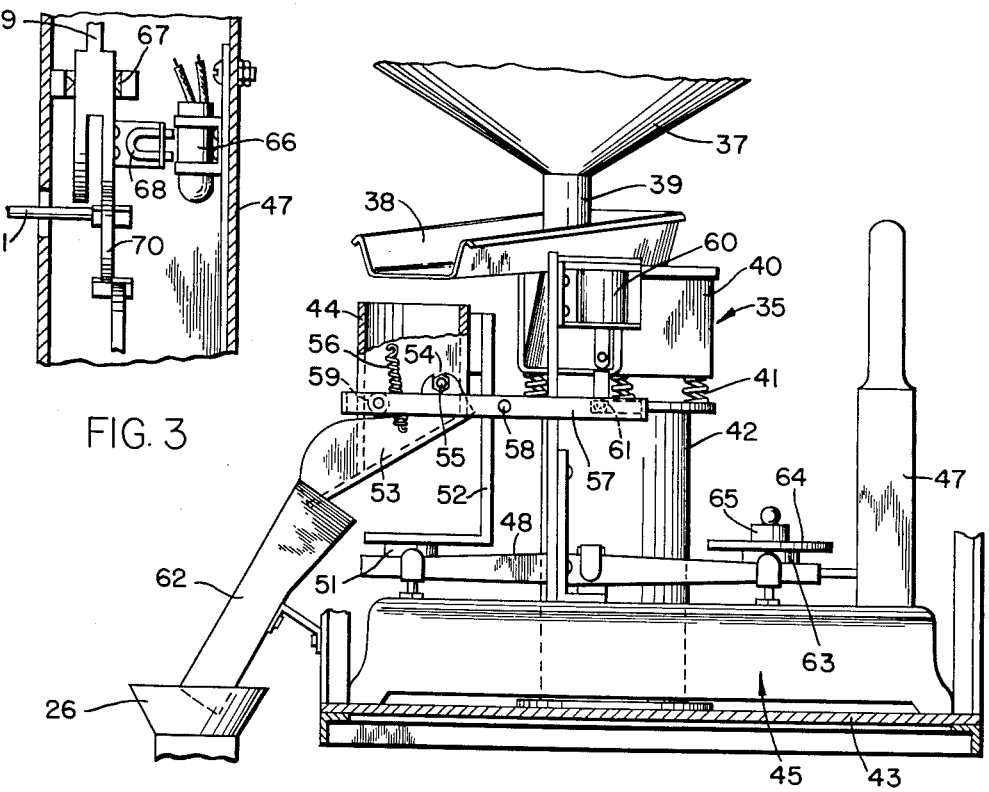
Figure 2 is a side elevational view, partly broken away, of the weigh-feeder having an automatically-controlled weight-compensating device.

The structure of the weigh-feeder 35 is shown best in Figures 1, 2 and 5 and includes the material hopper 37 which is rigidly supported by the frame 36 (Figure 1). Below this hopper is a vibratory feed trough 38 and into which the hopper discharges through the outlet nozzle 39, the end of which is disposed close to the bottom of the trough so that the material will feed slowly from the hopper into the trough. The trough 38 is carried by a vibratory-feeder 40 which is of the well-known electro-magnetically operated type. This feeder 40 is carried by springs 41 (Figure 2) on the upper end of a standard 42 which rests on a horizontal supporting shelf 43 which is carried by the framework 36 at a level above the ram 21.

The manner in which the vibratory-feeder 40 is controlled will be described later.

The vibratory feed trough 38 discharges into the weigh bucket 44 of a scale 45, shown in Figures 1 and 2, and preferably of the over-and-under weight type. This scale 45 includes a base which rests on the shelf 43 and is suitably attached thereto and an indicator tower 47 at one end thereof. On the base of the scale 45 there is fulcrumed an even-balance beam or lever 48 which is connected through suitable mechanism (not shown) to the over-and-under pointer 49, shown in Figures 6 to 9, which is associated with an over-and-under dial 50 in the upper portion of the tower 47. In actual practice, the dial and housing is disposed transversely of the press as shown in Figure 1 but is shown facing the observer in Figures 6 to 9 for the purpose of illustration.

The weigh bucket 44 is carried on the commodity outrider 51 of the scale by means of the rigid upstanding bracket 52 so that its upper open end is located directly below the discharge end of the vibratory feed trough 38.

The lower open-end of the bucket 44 has a trough-shaped gate 53 mounted for vertical swinging movement relative thereto between bucket-closing and dumping positions. The inner end of the gate 53 straddles the bucket 44 and has upwardly opening notches 54 which cooperate with trunnion pins 55 on the sides of the gate. The notches 54 make it possible to adjust the gate relative to the pins 55 and the gate is fixed in position relative to the notches by clamping nut units. The gate 53 is normally held in its uppermost or bucket-closing position against the lower end of the bucket 44 by means of a tension spring 56 which has its upper end anchored to the bucket 44 and its lower end connected to the gate 53. The gate 53 is moved into dumping position by means of a yoke 57 which straddles the bucket and gate and which is pivoted for vertical swinging movement at 58 to the upstanding bracket 52. The outer end of the yoke 57 carries the rollers 59 which are normally spaced above the edges of the gate but which engage such edges when the outer end of the yoke is moved downwardly. The yoke 57 is swung vertically by means of a dump solenoid 60 connected to the inner end of the yoke 57 by a sliding pivotal connection 61. The gate 53 is moved to dumping position by energizing the solenoid 60 which will lift the inner end of yoke 57 and will cause the rollers 59 to engage the gate and swing it downwardly so that the charge of material weighed in the bucket 44 will discharge through a directing chute 62 into the funnel 26. The chute 62 is attached to the frame 36 between the gate 53 and the funnel 26 and is so positioned as not to interfere with the weighing operation of the scale 45.

The other outrider 63 of the weighing beam 48 carries the weight platter 64 which is adapted to receive a fixed counterweight 65 of a preselected amount to provide for the desired weight of the charge to be accumulated in the bucket 44.

Figure 3:
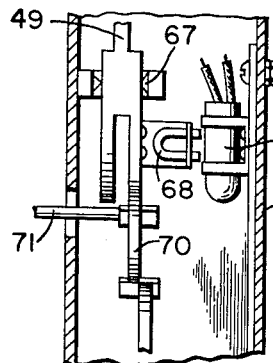
Figure 3 is a vertical sectional view through the lower portion of the indicator tower of the weighing scale of the weigh-feeder showing the lower end of the indicator and the associated vibratory-feeder switch which it controls.

The vibratory-feeder 40 is controlled by means of a mercury switch 66 which is provided in the lower end of the tower 47 as shown in Figure 3. The switch 66 is of the mercury type which is actuated electromagnetically by a magnet moved adjacent thereto. The switch 66 is fastened to the side of the tower 47, as shown in Figure 3. The lower end of the pointer 49, which is of the pendulum type carried by pivots 67, carries an electromagnet 68. This magnet 68 moves in a transverse plane, closely adjacent the switch 66, in accordance with the transverse swinging of the pointer 49. The pointer 49 and the beam 48 are biased towards correct weight or balanced position, from an underweight position, by means of the set of flexes 70 provided in the tower 47 below an extension 71 of the beam which extends into the tower. The magnet 68 is so located that when the scale beam 48 and the pointer 49 move to correct weight position, the switch 66 opens. This switch 66 will control the vibratory-feeder 40, as will later appear, to cause it to vibrate the feed-trough 38 as long as the material in the bucket is underweight and the beam 48 and pointer 49 move towards correct weight position, but to interrupt vibration thereof when the material in the bucket 44 is sufficient to bring the scale into balance. The switch 66 is included in a circuit which will be described later and some of the elements of this circuit are included in a box 72 (Figure 1) which is mounted on the frame 36.

The dump solenoid 60 is controlled by means of a combined dump switch and weight-compensating switch 73 which is associated with the ram 21 as shown in Figures 1 and 4. As shown in Figures 6 to 9, this combined switch 73 includes the set of dump circuit contacts 73a and the set of weight-compensating circuit contacts 73b. The dump contacts 73a are normally closed and the weight-compensating contacts are normally open, being held in these positions by the spring 75. The switch 73 is controlled by the pivoted switch lever 74 which is normally held in its rearwardmost position by the spring 75. The switch 73 is mounted for adjustment longitudinally of the press on the feed section 23 of the press below the ram 21. The housing of the switch 73 is mounted on a guide bracket 76 which is attached to the press section 23 and is adjustable on the bracket longitudinally of the press by means of the screw 76a. The lever 74 is pivoted at the top of the switch housing so that it will be engaged, upon forward movement of the ram 21, by a shoulder 21a on the ram. As will later appear, forward movement of the ram 21 into injecting position will actuate the switch 73 to disengage the contacts 73a and, if additional material is needed for the next charge, to engage the contacts 73b. Engaging the contacts 73b will actuate the weigh-feeder 35 to supply additional material to the charge in the bucket 44 at that time. As the ram 21 returns the contacts 73a are again engaged and this energizes the dump circuit to actuate the dump solenoid 60 to dump the charge accumulated in the bucket 44.

The weight-compensating arrangement of our invention on the weigh-feeder 35 comprises means for controlling the vibratory-feeder 40 thereof. This arrangement will serve to control the weight of the next charge for the injection operation in accordance with the forward position of the ram 21 and will compensate in the succeeding charge for variations in the preceding charge injected into the mold.

When this type of weight-compensating unit is on a weigh-feeder that is used on an injection press of the type employing cushion-feeding, the scale 45 is previously adjusted to deliver a pre-established charge substantially equal to a quantity required for one shot of the press, this usually including the quantity required to fill the die cavity or cavities plus the sprues and the runners along with the amount desired for the cushion. The fixed counterweight 65 will be selected to be slightly less than this quantity while the compensating arrangement, as will later appear, will be adjusted to cause the vibratory-feeder 40 to add an additional weight of material to a successive charge when needed. Instead of the weight 65, a movable poise weight could be employed on the scale in the well-known manner.

When the automatic weight-compensating system is applied to a molding machine operated with ram-bottoming, it can function in essentially the same manner except that the limit switch 73 will be located so that a very slight cushion of, for example .001 inch, will effect a weight correction that will again cause the ram to bottom on succeeding cycles. The control system, when used with ram-bottoming, will not function, when arranged as outlined, until the ram 21 has failed to bottom by at least a small degree, that is, until a slight cushion has been accumulated.

In Figure 5 we have illustrated the electric circuit for controlling the weigh-feeder 35 having the weight-compensating arrangement according to our invention. The main lines 90 and 91 lead from a suitable source of power and are under the control of a main on-off switch 92. The main line 91 has connected in series therein the coil of the magnet of the vibratory-feeder 40, a rheostat 99 for controlling the speed of vibration of the feeder, the rectifier 98 and the contact arm 94 of a power relay 93, the fixed contact point 95 of the relay, and the movable contact arm 110 of a time-delay relay 112 which controls the compensating circuit. The coil of the relay 93 is connected in a line 97 in which are connected the fixed contacts of the mercury switch 66, the line 97 being connected between the main line 91 and a line 96. The line 96 has the coil of the dump solenoid 60 connected therein and this coil is controlled by the normally closed contacts 121 of a time-delay relay 118 which controls the dump circuit. The line 96 also has connected therein in series the fixed contacts of the set of compensator contacts 73b, the on-off switch 119 for controlling the compensator circuit, the neon signal light 105 for the compensating circuit, and is also connected to a line 116. This line 116 has connected therein the coil of the time-delay relay 112 and connects the main line 91 to the line 96 of the compensating circuit. The relay 112 also has a second movable contact arm 113 which is ganged for operation with the arm 110. The coil of the dump circuit time-delay relay 118 is connected in a line 120 which has one end connected to a fixed contact point 122 of the relay 93 and its other end connected to the power line 91, the line 120 also having the fixed contacts of the set of dump control contacts 73a connected therein. The movable contacts of the sets 73a and 73b are ganged together for operation as previously indicated. The line 120 is connected to the other side of the circuit by a lead 123 which connects thereto and to the power line 90. The contacts of the relay 93 duplicate the action of the mercury switch 66 and the relay is used only to increase the life of the switch 66 since it will have a greater current carrying capacity than the switch.

It will be apparent from Figure 5 that each time the mercury switch 66 is closed, the relay 93 will be actuated to energize the magnet of the vibratory-feeder 40 and cause material to feed into bucket 44. Switch 66 will be closed, as previously indicated, whenever the scale 45 is in underweight condition and will be opened whenever it reaches correct weight condition to interrupt the feed of material. The dump contacts 73a are closed but will be mechanically opened upon each forward stroke of the ram and then closed upon the return stroke of the ram because of operation of the switch lever 74 by the ram. The add-weight compensating contacts 73b will normally be open but will be closed upon forward movement of the ram 21 if the ram moves sufficiently far forwardly or bottoms. The manual switches 92 and 119 will be closed to prepare the entire system for operation.

Assuming the ram 21 to be in the position shown in Figure 6, ready to start forward into injecting position, the scale has actuated the mercury switch 66 to open the feed circuit when the pointer 49 has reached a minimum weight position, after supplying a predetermined charge of material to the bucket 44; the compensating weight circuit is in normally open position because the switch lever 74 is in its rearwardmost position where the contacts 73b are opened; whereas the dump circuit is in normally closed position because the contacts 73a are closed, all as shown in Figure 5. As the plunger 21 moves forwardly, it contacts the switch lever 74 and swings it forwardly far enough to open the dump contacts 73a, as shown in Figure 7. The pointer 49 is still in the minimum weight position shown in Figure 6. Opening the contacts 73a breaks the circuit to the time-delay relay 118 so that it can reset itself in order that the weigh-bucket gate 53 will open to dump the charge accumulated in the bucket 44 subsequently when the dump contacts 73a are closed as the result of the return movement of the ram 21 (Figure 9). At this time, the contacts 73b are still open so that the add-weight or compensating circuit is not closed. If the injection is completed, with the ram 21 on bottom, as shown in Figure 8, the switch lever 74 will be moved forwardly sufficiently to close the add-weight or compensating contacts 73b, the dump contacts 73a still being held open so that the dump circuit is still broken. Closing the compensating circuit, starts timing of the time-delay compensating relay 112 and supplies current, through the closed time-delay relay contacts 110 and 113 and the engaging power relay contacts 94 and 95, to the magnet of the vibratory-feeder 40. This will cause an additional amount of material to be added to the charge previously accumulated in the bucket 44. This will bring the indicator pointer 49 to the position shown in Figure 8. The time-delay relay 112 is of such a type that it is adjustable over a wide range so as to provide variable periods during which the compensating circuit will energize the magnet of the feeder 40. Sometimes the ram 21 does not move far enough forwardly to move the switch lever 74 sufficiently to engage the contacts 73b and, if this happens, the compensating circuit will not be closed to actuate the feeder 40. If the compensating circuit is closed as indicated above, the feeder 40 will operate until the relay 112 times out which will cause the compensating circuit to be broken by upward swinging of the arms 110 and 113 of such relay. As the ram 21 moves back from the injection hold position, as shown in Figure 9, the switch lever 74 is returned to its normal position by the spring 75 so that the dump contacts 73a are again closed and the compensating contacts 73b are again opened. Closing the dump contacts 73a, energizes the time-delay relay 118 and starts its timing cycle and, at the same time, energizes the dump solenoid 60 to swing the gate 53 open and dump the charge accumulated in the bucket 44, including any additional amount or compensating amount of material previously fed thereinto. The time-delay relay 118 will time out to break the contacts 121, at which time, the circuit to the solenoid 60 is broken and the gate 53 will close. Dumping of the contents of the bucket 44 causes the scale pointer 49 to swing to an underweight position, closing the contacts of the switch 66. This will actuate the relay 93 moving its arm 94 from the point 95 to the point 122 and thereby completing a circuit to the magnet of the vibratory-feeder 40, from the line 91, through the line 123, to the line 90. This main feed will continue until the pointer 49 comes up into the minimum weight position of Figure 6, before the ram 21 moves forwardly again, and as the pointer reaches such position, the switch 66 will be actuated to deenergize the relay 93 and open the feed circuit. As the ram 21 now moves forwardly again, the same sequence of operations will be repeated. The position of switch housing 73 can be adjusted by the screw 76a to locate lever 74 relative to the ram in such a position that a desired cushion is obtained in front of the plunger. This adjustment is facilitated by the neon light 105 which will go on when the lever 74 closes the contacts 73b.

It will be apparent that with the compensating arrangement previously described and shown in Figures 1 to 9, inclusive, the compensating weight of material is supplied by extending the period of operation of the vibratory feeder 40 in order to supply an additional weight of material to the charge for the next injecting operation. However, a compensating effect can be obtained by varying the magnitude of vibration of the vibratory feeder and this can be accomplished by a variation in the resistance of the circuit which controls the magnet of the vibratory feeder.

In Figure 10, we have illustrated the electric circuit for controlling the weigh-feeder 35 with a weight-compensating arrangement whereby the magnitude of vibration of the feeder is varied to obtain the compensating effect. The main lines 90d and 91d lead from a suitable source of power and are under the control of a main on-off switch 92d. The lines 90d and 91d are connected to the coil of a vibratory feeder control relay 93d which includes a movable contact arm 94d that cooperates with a contact point 95d from which it is spaced with the coil of the relay deenergized. The arm 94d is connected by lead 96d to the movable contact of the mercury switch 66 which controls the vibratory feeder 40d. When switch 66d is open, the coil of relay 93d is deenergized, as shown, and when it is closed, the coil of the relay is energized.

The relay contact point 95d is connected by the line 97d in series to a rectifier 98d, and the contact arm 100d of a relay 101d which controls the compensating circuit. The contact point 102d of the relay 101d is connected to the line 970d which is connected in series to an adjustable resistance 99d, an adjustable resistance 990d, and another contact point 1020d of the relay. The coil of the magnet of the vibratory-feeder 40d is in a line 130d which connects to the line 970d between the resistances 99d and 990d and which also connects to the line 91. A line 103d connects to the line 91d and to the contact point 104d of the relay 101d, the coil of the relay being connected in this line 103d. The relay 101d also includes the movable contact arms 105d and 106d which are ganged with the arm 100d previously mentioned. With the coil of the relay 101d deenergized, as shown, the arm 106d is spaced from the point 104d, the arm 105d is spaced from the point 107d, and the arm 100d is spaced from the contact point 1020d but in engagement with the point 100d. The arm 105d is connected by a line 108d to the main line 90d. The contact point 107d is connected by a lead 109d to a lead 110d which connects to the line 103d between the coil of the relay 101d and the contact point 104d. Connected in the lead 110d, between its points of connection to the line 103d and the lead 109d, is the normally-open ram-operated limit switch 73d. The lead 110d also connects to the contact point 111d of a relay 112d. This relay also includes a contact point 113d which is connected to the arm 106d of the relay 101d. The relay 112d also includes a movable contact arm 114d which is connected to the line 108d. When the coil of the relay 112d is deenergized, the arm 114d of the relay is in contact with the point 113d and is spaced from the point 111d. The coil of the relay 112d is connected in a line 116d which leads from a point 117d of a relay 118d to a timer switch 119d and then to the main line 91d. The timer switch 119d is the usual timer switch provided on the press 20 known as the "injection hold" timer for holding the ram in injecting position for a predetermined time and closes when the ram is to return. This switch 119d controls the supply of current to both the coil of the relay 112d and the coil of the relay 118d, the latter being connected in a line 120d running from the line 116d to the main line 90d. The relay 118d includes a movable contact arm 121d which is connected to the line 108d and which, when switch 119d is open and the coil of the relay 118d is deenergized, is in contact with the point 117d. At this time, the coil of the relay 112d is also deenergized and the arm 114d thereof is in contact with the point 113d. The ram-operated dump switch 73e is connected in series in the line 124d with the coil of a time-delay relay 125d, the line 124d bridging the main lines 90d and 91d. The time-delay relay 125d includes a movable contact arm 126d which is connected to the line 124d, between the switch 73e and the coil of the relay 125d. The relay 125d also includes a contact point 128d which is connected to a line 129d that connects to the main line 90 and in this line 129 there is connected the coil of the dump-solenoid 60d. The relay 93d duplicates the action of the mercury switch 66d and is used only to increase the life of the switch 66d having a greater current carrying capacity than the switch. The dump switch 73e and the limit switch 73d, in this instance, are normally open but the dump switch 73e will be closed upon each forward movement of the ram. If the ram moves forwardly to a predetermined extent, on its injection stroke, it will also close the switch 73d after closing the switch 73e.

It will be apparent from Figure 10 that each time the mercury switch 66d is closed, the relay 93d will be actuated to energize the magnet of the vibratory-feeder 40d and cause material to feed into the bucket 44. Switch 66d will be closed, as previously indicated, whenever the scale 45 is in underweight condition and will be opened whenever it reaches correct weight condition to interrupt the feed of material. The dump switch 73e is normally open but will be mechanically closed upon each forward stroke of the ram, as previously described. However, the dump switch could be located to operate on the return stroke. Closing of the switch 73e will supply current through contacts 126d and 128d to the dump-solenoid 60d which will energize it and cause it to open the gate 53, so that the charge weighed in the bucket 44 will be supplied to the funnel 26 of the press 20. Also, when the switch 73e is closed, current is supplied to the coil of the time-delay relay 125d and timing of the relay starts. When the relay times out, the arm 126d swings away from the point 128d and the supply of current to the solenoid 60d is interrupted. Thus, the gate 53 will be closed, allowing the scale 45 to assume underweight condition and the vibratory-feeder will again be operated. This will happen even while the ram 21 is still in its injecting or forward position.

The contacts 119d of an injection-hold timing relay are provided on the usual injection molding press and control the length of time the ram stays forward. They close when the ram is to return. When they close, if the limit switch 73d has not been closed by the movement of the ram 21 forwardly to a predetermined extent as previously described, the relay 101d will not be actuated. Therefore, the current to the magnet of the feeder 40d will be supplied through the arm 100d of the relay 101d, the point 102d and the resistance 99d which will have greater resistance than the resistance 990d, so that the next charge of material weighed by the scale 45 will not be increased in weight. However, if the limit switch 73d has been closed by forward movement of the ram 21, the relay 101d will be energized so that the contact arm 100d will be separated from the point 102d and will engage the point 1020d, so that current will be supplied to the magnet of the feeder 40d through the resistance 990d which is of lesser value and which will cause the feeder to vibrate with greater magnitude, with the result that the next charge weighed will be of increased weight. Thus, the contacts 119 of the time-delay relay, which closes when the ram 21 is to return, operates the relay 112 which, in turn, determines the magnitude of vibration of the feeder 40d. This determination is made at the extreme forward stroke of the ram, just before it returns. The relay 112d operates momentarily to measure, in effect, the forward position of the ram 21. The condition of the compensating circuit to the feeder 40d is subject to change only during the short interval that the relay 112d is energized. The time-delay relay 118d is actuated by the timing relay contacts 119d to effect momentary operation of the relay 112d regardless of the closed interval of the relay contacts 119d. Provided the limit switch 73d is closed, the relay 101d will remain energized through its contacts 105d and 107d during the time the arm 114d of the relay 112d is completing its excursion from the contact point 111d to the contact point 113d. This relay 101d will remain energized through its contacts 106d and 104d regardless of subsequent opening of the limit switch 73d. Thus, one or the other of the resistances 99d and 990d of the compensating circuit will be selected automatically, in each forward stroke of the ram 21 to vibrate the feeder 40d with greater or lesser magnitude. This will, in turn, control the weight of the subsequent charge of material weighed by the scale 45.

When the limit switch 73d is open, the vibratory-feeder 40d will be energized through the resistance 99d. When the switch 73d is closed, the feeder will be energized through the resistance 990d. This resistance will be set to offer less resistance than resistance 99d and, therefore, the vibratory-feeder 40d will feed faster and more material will be supplied in the next charge. Only the fixed weight 65 will be used and the weight compensation in succeeding charges will occur by automatically switch the control of the vibratory-feeder 40d back and forth, as required, between the resistances 990d and 99d. Compensation takes place by varying the quantity of material in suspension between the feeder and the scale. It will be apparent that adjustment of the operating point of switch 66d, with relation to the scale dial 50, takes into account the quantity of material in suspension (commonly called suspension column) between the feeder trough 38 and the scale bucket 44, for a given rate of feed. Increasing the rate of feed increases material in suspension, and thus the scale balances overweight. Decreasing the rate of feed decreases the material in suspension and thus the scale balances underweight.

It will be apparent from the above that we have provided an injection molding machine with a weigh-feeder which not only weighs each charge and supplies it to the ram automatically in accordance with operation of the ram but which will be adjusted automatically by operation of the ram to compensate for variations in the quantity of plastic material required by the molding machine. The weigh-feeder is simple, efficient and is completely automatic.

Various other advantages will be apparent.

Having thus described our invention, what we claim is:

1. An injection molding machine having a ram reciprocable between injecting and non-injecting positions, a weigh-feeder for weighing predetermined charges of molding material, said weigh-feeder comprising a weighing scale, electric means actuated by the scale for feeding material to the weighing scale to cause the scale to weigh a predetermined charge, electric means for successively supplying the weighed charges from the scale to the ram, and an electric compensating circuit controlled by the position of the ram as it completes its injecting stroke for automatically controlling said electric feeding means to control the weight of successive charges weighed on said scale.

2. An injection molding machine according to claim 1 in which said electric means for supplying the charges from the scale to the ram includes an electromagnetic unit, and a switch actuated by the ram for controlling said electromagnetic unit.

3. An injection molding machine according to claim 1 in which said material feeding means is electromagnetically operated, and a switch operated by said scale for controlling said electromagnetically operated feeding means.

4. An injection molding machine according to claim 3 in which said compensating circuit includes a limit switch actuated by the ram.

5. An injection molding machine according to claim 4 in which the electric means for supplying of charges to the ram is controlled by a switch disposed adjacent the path of travel of the ram and the ram engages said switch during each reciprocating cycle of the ram, said limit switch for controlling said compensating means being actuated by said ram only when the ram moves to a predetermined extent in its injecting stroke.

6. An injection molding machine according to claim 5 in which said compensating circuit includes means for controlling said electromagnetically operated feeding means.

7. An injection molding machine according to claim 6 in which said compensating circuit includes means for actuating said feeding means for a predetermined period after the scale-operated switch renders it inoperative whenever the limit switch is actuated.

8. An injection molding machine according to claim 6 in which said compensating circuit includes independent portions with different value resistances therein for controlling said feeding means, and means controlled by said limit switch for shifting the control of said electromagnetic feeding means from one portion of the circuit to the other.

9. An injection molding machine according to claim 4 including a relay controlled by said limit switch for actuating said compensating and timing means for controlling actuation of said relay.

10. An injection molding machine according to claim 4 in which there is connected between the electromagnetic unit which supplies the charges to the ram and the switch which controls it a time-delay relay which will break the circuit to said unit after a predetermined interval.

11. An injection molding machine according to claim 10 in which said electric means for feeding material to the scale is an electromagnetic vibratory-feeder.

12. An injection molding machine according to claim 10 in which means is provided for adjusting the rate of feed of said feeder.

13. An injection molding machine according to claim 12 in which said scale comprises a weighing bucket into which said feeder discharges, and said charge-supplying unit includes a solenoid for controlling discharge from said bucket.

14. An injection molding machine according to claim 13 in which said feeder is controlled by a switch actuated by the scale whenever it is in underweight condition to complete the circuit to said electromagnetic vibratory-feeder, said time-delay means comprising a relay for breaking the circuit to said feeder after a predetermined interval even when the ram-operated switch is closed.

References Cited in the file of this patent

UNITED STATES PATENTS

| | | |
|---|---|---|
| 2,156,895 | Godet | May 2, 1939 |
| 2,159,559 | Lawyer | May 23, 1939 |
| 2,320,594 | Hempel | June 1, 1943 |
| 2,627,087 | Hendry | Feb. 3, 1953 |
| 2,628,055 | Knobel et al. | Feb. 10, 1953 |
| 2,688,459 | Merril et al. | Sept. 7, 1954 |